United States Patent
Betts (10) Patent No.: US 7,733,966 B2
(45) Date of Patent: *Jun. 8, 2010

(54) SYSTEM AND METHOD FOR SPACE DIVERSIFIED LINEAR BLOCK INTERLEAVING

(75) Inventor: William L. Betts, St. Petersburg, FL (US)

(73) Assignee: Summit Technology Systems, LP, Bala Cynwyd, PA (US)

( * ) Notice: Subject to any disclaimer, the term of this patent is extended or adjusted under 35 U.S.C. 154(b) by 1322 days.

This patent is subject to a terminal disclaimer.

(21) Appl. No.: 10/681,687

(22) Filed: Oct. 8, 2003

(65) Prior Publication Data

US 2004/0071240 A1    Apr. 15, 2004

Related U.S. Application Data

(63) Continuation-in-part of application No. 09/073,103, filed on May 5, 1998, now Pat. No. 6,668,023.

(60) Provisional application No. 60/070,070, filed on Dec. 30, 1997.

(51) Int. Cl.
   *H04K 1/10* (2006.01)
   *H04B 15/00* (2006.01)
   *H04B 7/02* (2006.01)

(52) U.S. Cl. .................. 375/260; 375/285; 375/267

(58) Field of Classification Search .............. 375/259, 375/260, 296, 295, 285, 278, 284, 316, 346, 375/267, 222, 219, 229, 230, 232; 370/464; 714/699, 746, 752, 755, 756

See application file for complete search history.

(56) References Cited

U.S. PATENT DOCUMENTS

| | | | | |
|---|---|---|---|---|
| 3,697,874 A | * | 10/1972 | Kaneko | 375/292 |
| 3,749,841 A | * | 7/1973 | Cohen et al. | 370/298 |
| 5,056,117 A | * | 10/1991 | Gitlin et al. | 375/234 |
| 5,177,767 A | * | 1/1993 | Kato | 375/142 |
| 5,241,563 A | * | 8/1993 | Paik et al. | 375/262 |
| 5,291,289 A | * | 3/1994 | Hulyalkar et al. | 348/723 |
| 5,400,322 A | | 3/1995 | Hunt et al. | 370/19 |
| 5,416,801 A | * | 5/1995 | Chouly et al. | 375/260 |
| 5,457,712 A | * | 10/1995 | Weerackody | 375/347 |
| 5,636,224 A | * | 6/1997 | Voith et al. | 714/701 |

(Continued)

OTHER PUBLICATIONS

Ramsey, "Realization of Optimum Interleavers", IEEE Transactions on Information Technology, vol. IT_16, No. 3, May 1970; pp. 338-345.*

(Continued)

*Primary Examiner*—David C Payne
*Assistant Examiner*—Vineeta S Panwalkar
(74) *Attorney, Agent, or Firm*—Woodcock Washburn LLP (57) ABSTRACT

The present invention is directed to unique methods and apparatus for suppressing impulse noise in a multipoint communications environment using a linear block interleaver. One representative embodiment comprises first logic configured to arithmetically combine a time series of input symbols into a block of N-symbol combinations, and second logic configured to transmit, on a separate channel, each N-symbol combination to a receiver. The first logic is located in a transmitter of a first communications device. The time series has size N and N is greater than one, and each of the input symbols is taken from a signaling constellation.

19 Claims, 7 Drawing Sheets

U.S. PATENT DOCUMENTS

| | | | | | |
|---|---|---|---|---|---|
| 5,651,090 | A | * | 7/1997 | Moriya et al. | 704/200.1 |
| 5,757,821 | A | * | 5/1998 | Jamal et al. | 714/746 |
| 5,805,583 | A | * | 9/1998 | Rakib | 370/342 |
| 5,960,039 | A | * | 9/1999 | Martin et al. | 375/267 |
| 5,983,388 | A | * | 11/1999 | Friedman et al. | 714/776 |
| 6,005,876 | A | * | 12/1999 | Cimini et al. | 370/525 |
| 6,018,545 | A | * | 1/2000 | Fukumasa et al. | 375/141 |
| 6,160,854 | A | * | 12/2000 | Heegard et al. | 375/265 |
| 6,178,196 | B1 | * | 1/2001 | Naguib et al. | 375/148 |
| 6,208,669 | B1 | * | 3/2001 | Cimini et al. | 370/525 |
| 6,668,023 | B1 | | 12/2003 | Betts | 375/285 |

OTHER PUBLICATIONS

"Coordinated Coding for Multi-Line DSL," Telcordia Technologies, Ken Kerpez, T1E1.4/2002-120, Apr. 8, 2002.

"Constellations for Good Diversity Performance," Kenneth J. Kerpez, IEEE Transactions on Communications, vol. 41, No. 9, Sep. 1993, pp. 1412-1421.

"G.bond: G.gen: G.shdsl: Space Diversity Implementation of Multi-pair Transmission," Paradyne Corporation, William Betts, T1E1.4/2003.146, May 19, 2003.

"Multicarrier Modulation for Data Transmission: An Idea Whose Time Has Come" by John A.C. Bingham, Published May 1990 in IEEE Communications Magazine.

* cited by examiner

SYSTEM AND METHOD FOR SPACE DIVERSIFIED LINEAR BLOCK INTERLEAVING

CROSS-REFERENCE TO RELATED APPLICATIONS

This application is a continuation-in-part of Application Ser. No. 09/073,103 ("Linear Block Interleaver System and Method") filed May 5, 1998, now U.S. Pat. No. 6,668,023, which claims the benefit of U.S. Provisional No. 60/070,070, filed Dec. 30, 1997.

FIELD OF THE INVENTION

The present invention relates generally to data communications, and more particularly, to a system and method for suppressing impulse noise in a multipoint communications environment using a linear block interleaver.

BACKGROUND

In the field of data communications, a modem is used to convey information from one location to another. Digital subscriber line (DSL) technology now enables modems or other devices to communicate rapidly large amounts of data. Devices communicate by modulating a baseband signal carrying digital data, converting the modulated digital data signal to an analog signal, and transmitting the analog signal over a conventional copper wire pair using techniques that are well known in the art. These known techniques include mapping the information to be transmitted into a signal space constellation, encoding the information to reduce errors and improve throughput, and transmitting the information over a communication channel. The constellation can include digital information, or analog and digital information. At a receiver, the signal is received, equalized, and decoded in accordance with techniques that are known in the art.

In the above mentioned communications system, a control device, i.e., one that is located at a telephone company central office, connects the communication channel to a plurality of remote devices typically located at a customer residential or business location. This topography is known as a multipoint communication environment because one control device is communicating with a plurality of remote devices co-located at a remote location, over a single communication channel.

The communication technique between the control device and the remote device is generally half duplex in nature, meaning that only one device may transmit at any particular time. Existing techniques such as carrierless amplitude/phase modulation (CAP) and discrete multitone (DMT) modulation allow modems to transmit simultaneously between only two devices at a time. In a multipoint environment, greater circuit efficiency is possible because of the ability to connect multiple devices to the same communication channel.

In any communication environment, noise is an ever-present obstacle to optimal receiver performance. Noise imparted by the communication channel can be substantially eliminated through the use of well-known techniques, such as preceding and channel equalization. Local noise imparted to a channel, such as periodic impulse noise, from local sources such as electrical appliances and light dimmers, and random impulse noise, such as switching relays in a central office (CO), present an even greater problem that can degrade receiver performance.

DSL equipment is susceptible to these impairments. In order to combat crosstalk, carrierless amplitude/phase (CAP) modulation uses a precoder, while discrete multi-tone (DMT) selectively disables the affected frequency bins. The 60 Hz periodic impulse noise (for example, that generated by a local electrical appliance, such as a light dimmer) and other impulse noise generated, for example, by a switching relay at the central office is allowed to exist. However, the resulting errors are corrected by a forward error correction code, sometimes used in combination with a bit-wise interleaver.

This arrangement works fairly well in point-to-point applications where the delay caused by the coding is not problematic, however, for multipoint applications, the codes are ineffective. For example, the precoder used with CAP is located in the transmitter, and will cause discontinuities when the transmitter is switched on and off, as frequently occurs in a multipoint environment. Furthermore, the control device in the multipoint environment can have but one set of precoder coefficients for broadcasting to all remote devices, which may have different precoder needs. In addition, ringing caused by on/off polling cannot be canceled by a precoder because the transmitter and precoder are inoperable during the ringing transient.

Other error correction codes are available which can be used to reduce some of the errors caused by impulse noise. For example, block codes, and more specifically, linear block codes have been developed for use in communications systems to correct or reduce the number of burst errors in data transmission. However, these codes have excess delay and have been unable to successfully reduce or eliminate the type of random impulse noise generated by relay switching equipment in a telephone company central office.

Therefore, it would be desirable to provide a noise suppression system and method in both a transmitter and a receiver to reduce or eliminate the impulse noise imparted to a receiver, without the need for forward error correction.

SUMMARY

The present invention is directed to unique methods and apparatus for suppressing impulse noise in a multipoint communications environment using a linear block interleaver. One representative embodiment, among others, is a method that comprises the steps of: mathematically combining, in a transmitter of a first communications device, a time series of input symbols, where the time series has size N and N is greater than one, into a block of N-symbol combinations, where each of the input symbols is taken from a signaling constellation; and transmitting, on a separate channel, each N-symbol combination to a receiver.

Another embodiment, among others, is a system that comprises first logic configured to arithmetically combine a time series of input symbols into a block of N-symbol combinations, and second logic configured to transmit, on a separate channel, each N-symbol combination to a receiver. The first logic is located in a transmitter of a first communications device. The time series has size N and N is greater than one, and each of the input symbols is taken from a signaling constellation.

DESCRIPTION OF THE DRAWINGS

The accompanying drawings illustrate several aspects of the present invention, and together with the description serve to explain the principles of the invention.

DETAILED DESCRIPTION

Having summarized the inventive concepts of the present invention, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

In one embodiment of the invention, described in co-pending Application No. 09/073,103, a block of N symbols is sequentially interleaved and then transmitted sequentially, resulting in a decoder delay of (N−1) symbols. This delay prevents the efficient use of a decision feedback equalizer (DFE), which is the preferred type of equalizer because it boosts the signal without also boosting the noise.

Another embodiment of the invention, space-diversified linear block interleaving, can be used when multiple channels are available for transmission. Multiple channels can be implemented using either separate physical channels, or separate logical channels. An example of multiple physical channels would be a variety of DSL using multiple wire pairs to the same subscriber location in order to extend data transmission rates above single-pair rates. One example of multiple logical channels would be multi-carrier modulation, such as DSL DMT, which uses one wire pair going to a subscriber to carry data on multiple logical channels that are separated by frequency. Multi-carrier modulation can also be used in wireless applications, such as Orthogonal Frequency Division Multiplexing (OFDM).

Figure 1:
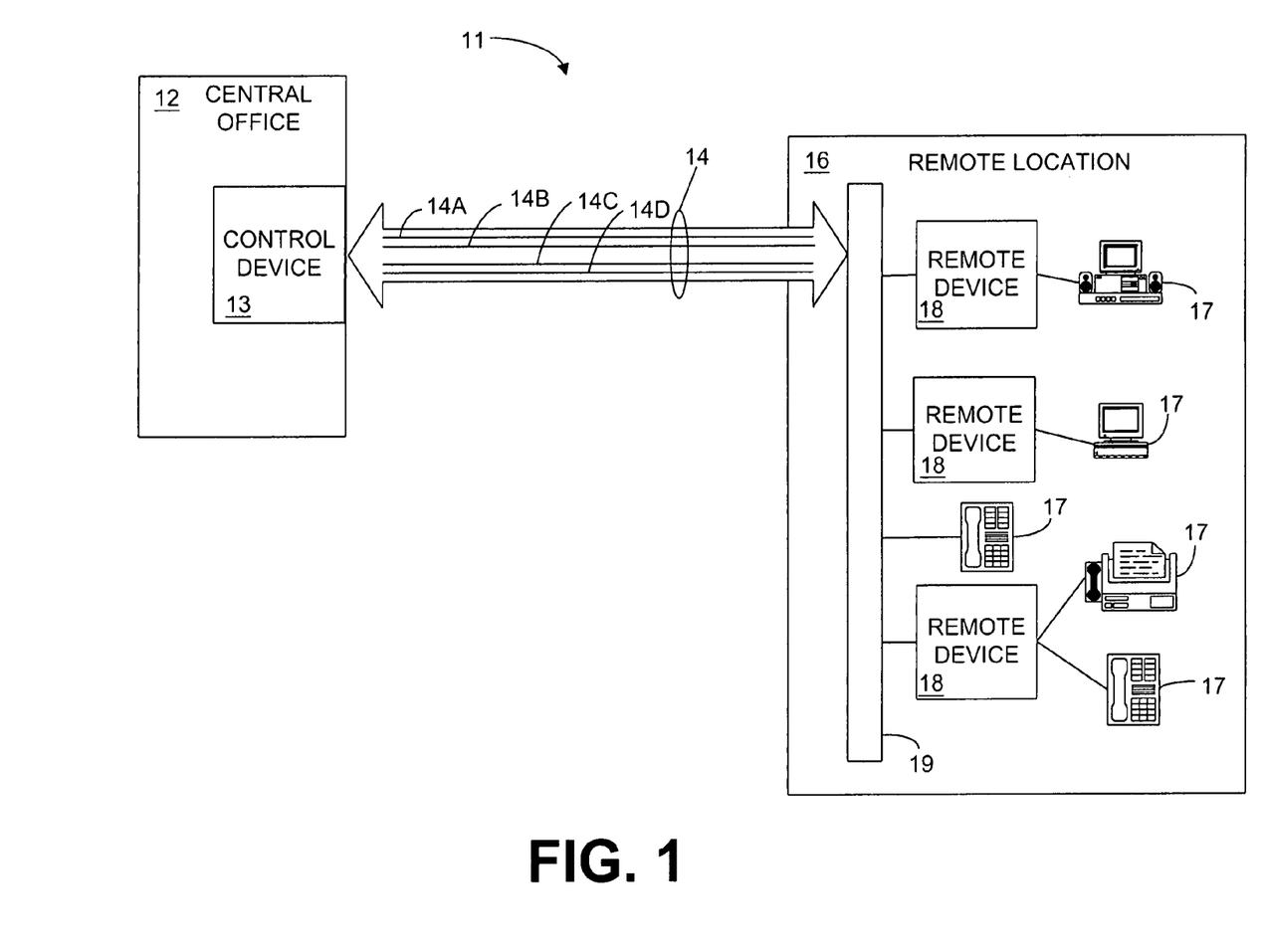
FIG. 1 is a block diagram of a multipoint communications environment in which devices employing the space diversified linear block interleaver of the present invention are used.

FIG. 1 is a block diagram of a multipoint communications environment 11 in which devices employing the space diversified linear block interleaver of the present invention are used. Remote location 16 is connected to central office location 12 via communication channel 14. In the preferred embodiment, control device 13 and remote device 18 are illustratively digital subscriber line (DSL) communication devices. However, the concepts of the present invention are applicable to various other types of communication devices.

Control device 13 is located at central office location 12. Control device 13 is connected to remote location 16 by communication channel 14, which contains multiple logical channels all going to the same subscriber location. Communication channel 14 is typically a bundle of copper wire pairs.

Remote location 16 contains communication bus 19, which is illustratively the copper wiring infrastructure at remote location 16. User devices such as telephones may be connected to communication bus 19, and thus to communication channel 14. At least one remote device 18 connecting a plurality of user devices 17 to communication bus 19, and thus to communication channel 14.

Remote devices 18 are typically located in a residential or business location. By using control device 13 and remote devices 18 employing the space diversified linear block interleaver of the present invention, it is possible for the receiver located in remote device 18 or control device 13 to efficiently suppress or cancel impulse noise and crosstalk generated in the communication system.

For simplicity, the space diversified linear block interleaver of the present invention will be described as residing in the transmitter of control device 13 and receiver of remote device 18. However, the space diversified linear block interleaver system and method can be applied to any communication transmitter and receiver, including the transmitter located in remote device 18 and receiver located in control device 13.

Figure 2:
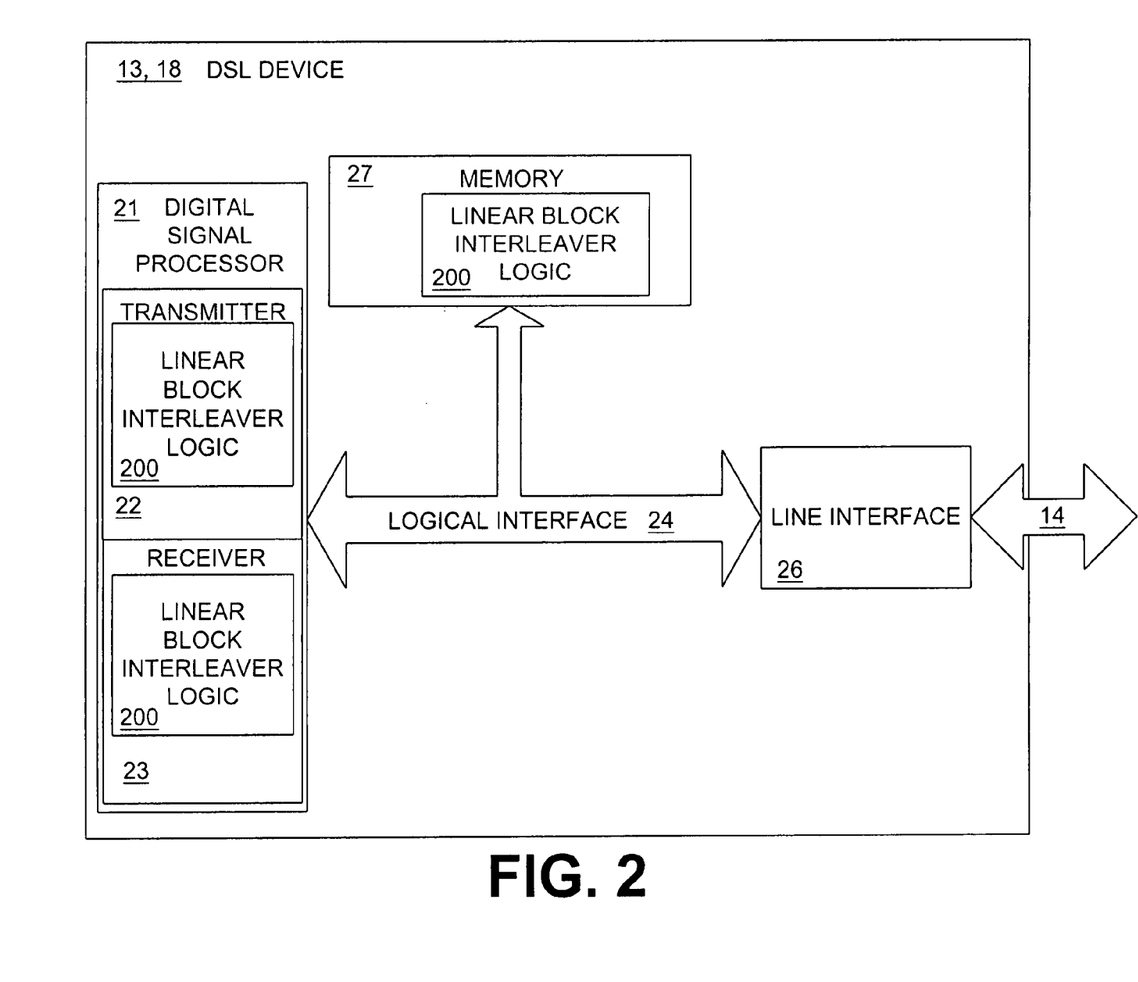
FIG. 2 is a block diagram illustrating either the remote device or the control device of FIG. 1, including the space diversified linear block interleaver of the present invention.

FIG. 2 is a block diagram illustrating either remote device 18 or control device 13 of FIG. 1, including the space diversified linear block interleaver of the present invention.

Typically, control device 13 will transmit signals to remote devices 18 over communications channel 14. Similarly, remote devices 18 will transmit signals to control device 13.

Remote device 18 and control device 13 contain conventional components as is known in the art of data communications. The present invention can be implemented in software, hardware, or a combination of the two. Digital signal processor (DSP) 21 controls the operation of the devices' transmitter 22 and receiver 23, and couples to line interface 26 via logical interface 24 to gain access to communications channel 14. Also included in transmitter 22 and receiver 23 is SDLBI logic 200, which enables the devices to efficiently suppress or eliminate impulse noise imparted to the communication channel. Remote device 18 and control device 13 also include memory 27.

In a preferred embodiment, the SDLBI logic of the present invention is executed within DSP 21 and is therefore shown as residing in both DSP 21 and memory 27. However, the SDLBI logic can be stored on any computer-readable medium, for transport or for use by or in connection with any suitable computer-related system or method. In the context of this document, a computer-readable medium is an electronic, magnetic, optical, or other physical device or means that can contain or store a computer program for use by or in connection with a computer-related system or method.

Figure 3:
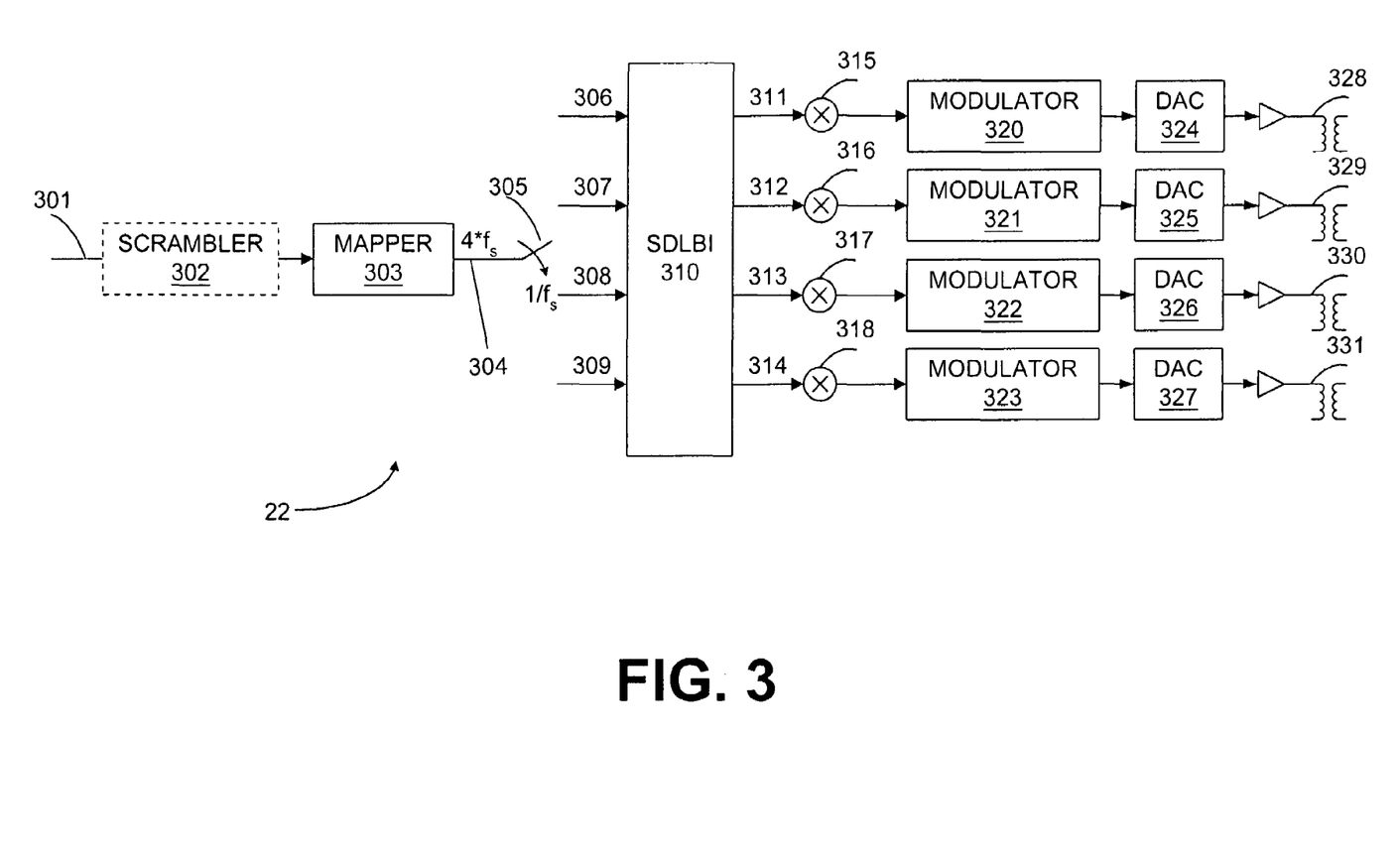
FIG. 3 is a block diagram of the transmitter of FIG. 2.

FIG. 3 is a block diagram of the transmitter 22 of FIG. 2. An N-bit word of data to be transmitted is input on line 301 to optional scrambler 302. In the absence of scrambler 302, data to be transmitted is input directly to mapper 303. Scrambler 302 can be either a self-synchronizing scrambler or a preset free running scrambler as known in the art. If scrambler 302 is employed, then a scrambled N-bit data word is supplied on line 304 to mapper 303.

Mapper 303 supplies complex X and Y vectors representing the data to be transmitted in a signal space constellation as known in the art, using for example, quadrature amplitude modulation (QAM). While the output of mapper 303 on line 304 is shown as a single line in this example embodiment, the output of mapper 303 is a multidimensional signal comprising complex X and Y vectors.

The concepts and features of the present invention are equally applicable to, for example, to coded or uncoded modulation schemes that are known in the art. While a preferred embodiment is described as interleaving four symbols in a two-dimensional signal space constellation, the concepts and features of the present invention are applicable to interleaving any number of symbols in a signal space of any dimension.

A commutator switch 305 at the output of the mapper 303 splits the single stream of input symbols from the mapper 303 into N inputs to space diversified linear block interleaver (SDLBI) 310. The symbol rate of each channel is $f_s$, so mapper 303 operates at $N*f_s$, and commutator switch 305 operates at $1/f_s$. Commutator switch 305 sends the first symbol to the first input 306 of space diversified linear block interleaver (SDLBI) 310, the second symbol to the second input 307 of SDLBI 310, up and including the last symbol to the last input 309 of SDLBI 310. Thus, in one symbol period, commutator switch 305 deposits N new symbols into the N inputs of SDLBI 310.

SDLBI 310 operates on the block of N symbols to output, in a single symbol period, an interleaved block of N symbols on lines 311-314. The operation of SDLBI 310 will be discussed in more detail later. Instead of a single mapper operating at $N*f_s$, one mapper could be used for each channel, making commutator switch 305 unnecessary.

The remainder of the transmit stage following SDLBI 310 is replicated N times, one for each of N outputs 311-314. Thus, the transmitter 22 contains N scalars, N modulators, and N output channels. Each scaler 315-319 scales the interleaved symbols to achieve uniform power on each channel, with the multiplier chosen to adjust for a constellation of $2^{Bi}$ points, encoding $B_i$ bits per symbol.

Each modulator 320-323 modulates the interleaved symbol onto a carrier. After any filtering appropriate for a particular modulation scheme (for example, Hilbert filtering), each modulated signal is then supplied to a communication channel in a manner which is channel-dependent. In this example, the communication channel corresponds to a particular twisted pair 14a-d (FIG. 1), so each modulated signal is supplied first to a DAC 324-327 and then to a conventional hybrid circuit 328-331.

Figure 4:
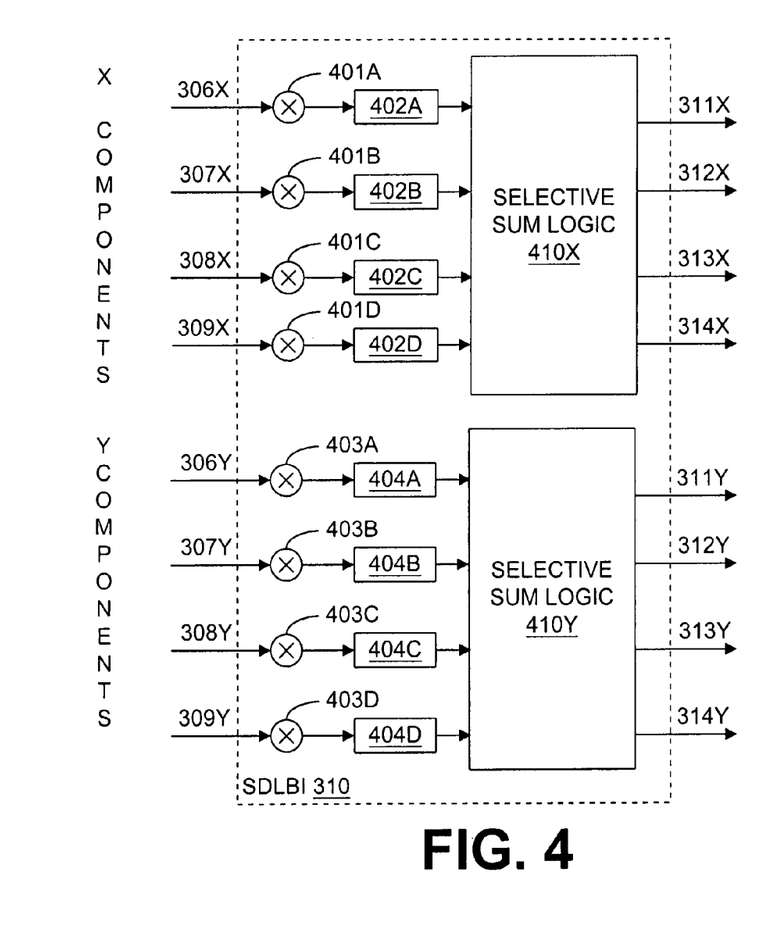
FIG. 4 is a block diagram of the space diversified block interleaver of FIG. 3.

FIG. 4 is a block diagram of the SDLBI 310 of FIG. 3. The SDLBI 310 contains logic to independently interleave the X and Y components of the two-dimensional input symbols provided by mapper 303. As will be discussed with respect to FIG. 6, the receiver 23 arithmetically combines the received N-symbol combinations to recover the original independent symbols.

The SDLBI 310 is divided into two identical logic blocks, one processing the X components and one processing the Y components of the two-dimensional input symbols.

Therefore, although each input to SDLBI 310 is shown as a single line 306-309 in FIG. 3, each one appears as two lines of input to the SDLBI 310 in FIG. 4. In FIG. 4, the X components of the complex vector input symbols are provided on lines 306-309x, and the Y components are provided on lines 306-309y. Similarly, the SDLBI 310 in FIG. 4 is shown with output lines 311-314x and 311-314y. While shown in this preferred embodiment as operating on a two-dimensional signal, the SDLBI 310 of the present invention can operate on any signal by replicating the appropriate number of logic blocks.

Input symbols are supplied to SDLBI 310 as follows. The commutator switch 305 supplies the X component of the first symbol on line 306x, which is scaled by scaler 401a and then stored in register 402a. Similarly, the Y component of the first symbol is supplied on line 306y, which is scaled by scaler 403a and then stored in register 404a. At the next symbol time, commutator switch 305 supplies the X and Y components of the second symbol on 307x and 307y, and the components are scaled by scalars 401b and 403b and stored in registers 402b and 404b. At the next symbol time, commutator switch 305 supplies the X and Y components of the third symbol on 308x and 308y, and the components are scaled by scalers 401c and 403c and stored in registers 402c and 404c. On the last symbol of the block, commutator switch 305 supplies the X and Y components of the fourth symbol on 309x and 309y, and the components are scaled by scalers 401d and 403d and stored in registers 402d and 404d.

Once the block of N symbols has been switched by commutator 305 and collected into registers, the register contents are supplied to selective sum logic blocks 410x and 410y as follows. The contents of registers 402a-d, containing the scaled X components of N input symbols, are supplied to selective sum logic block 410x. Similarly, the contents of registers 404a-d, containing the scaled Y components of N input symbols, are supplied to selective sum logic block 410y. Taken together, the two selective sum logic blocks produce, within a single symbol period, a block of N interleaved output symbols on lines 311-314x and 311-314y.

The choice to scale at the input to the selective sum logic blocks 410x and 410y reduces the dynamic range of the input signal, which can reduce the complexity of the arithmetic logic in the selective sum logic block. Alternatively, the values may be scaled within or at the output of selective sum logic blocks 410x and 410y.

Figure 5:
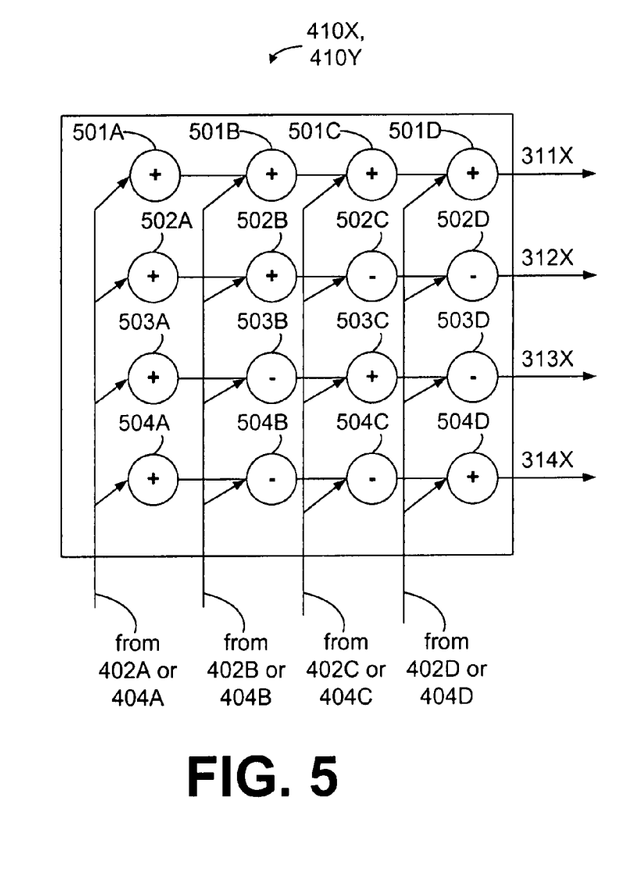
FIG. 5 is a block diagram of the selective sum logic block of FIG. 4.

FIG. 5 is a block diagram of the selective sum logic block 410 of FIG. 4. The selective sum logic block 410 implements the following equations for a 4-symbol linear block interleaver.

$$x=(iLBIx[0]+iLBIx[1]+iLBIx[2]+iLBIx[3])*0.5;$$

$$y=(iLBIy[0]+iLBIy[1]+iLBIy[2]+iLBIy[3])*0.5;$$

$$iLBIx[4]=(iLBIx[0]+iLBIx[1]-)iLBIx[2]-iLBIx[3])*0.5;$$

$$iLBIy[4]=(iLBIy[0]+iLBIy[1]-iLBIy[2]-iLBIy[3])*0.5;$$

$$iLBIx[5]=(iLBIx[0]-iLBIx[1]+iLBIx[2]-iLBIx[3])*0.5;$$

$$iLBIy[5]=(iLBIy[0]-iLBIy[1]+iLBIy[2]-iLBIy[3])*0.5;$$

$$iLBIx[6]=(iLBIx[0]-iLBIx[1]-iLBIx[2]+iLBIx[3])*0.5;$$

$$iLBIy[6]=(iLBIy[0]-iLBIy[1]-iLBIy[2]+iLBIy[3])*0.5;$$

The buffered input symbols are iLBIx[0-3] and iLBIy[0-3]. The interleaved output samples are x and y for the first pair. Then iLBIx[4-6] and iLBIy[4-6] are buffered outputs for the last three pairs of the block. Selective sum logic block 410 contains an array of arithmetic operators 601a-d, 602a-d, 603a-d, and 604a-d, which selectively sum the values contained in registers 402a-d (or 404a-d) according the above equations. The N output values on lines 311x-314x (or 311y-314y) are available in the same symbol period.

Arithmetic operators 601a-d in selective sum logic block 410x mathematically combine the N symbols in registers 402a-d according to the first X interleave equation, while in block 410y they combine the N symbols in registers 404a-d according to the first Y interleave equation. Similarly, arithmetic operators 602a-d in selective sum logic blocks 410x and 410y combine the N symbols in registers 402a-d or 404a-d in accordance with the second X and Y interleave equations above. Finally, arithmetic operators 603a-d and arithmetic operators 604a-d combine register locations 402a-d (or 404a-d) in accordance with the third and fourth X and Y interleave equations, respectively. Selective sum logic block 410 thus produces a block of interleaved symbols, each interleaved symbol containing an N-symbol combination, that is, a combination of all N input symbols.

As explained above with reference to FIG. 3, communications channel 14 consists of multiple channels 14a-d (either logical or physical channels). If the characteristics of the channels vary, then one channel may have excess margin. The SDLBI 310 permits sharing of this excess margin as follows. The equations for a communications system with two channels are:

$$y1=0.707*x1+0.707*x2$$

$$y2=0.707*x1-0.707*x2$$

where x1 and x2 are the symbols to be transmitted and y1 and y2 are the interleaved symbols that are actually transmitted on channel 1 and channel 2 respectively. The same equations are used to de-interleave the symbols received on the two channels. The received symbols will include additive noise n1 and n2 from each respective pair. The de-interleaved symbols are:

$$x1'=0.707*y1'+0.707*y2'=x1+0.707*n1+0.707*n2$$

$$x2'=0.707*y1'-0.707*y2'=x2+0.707*n1-0.707*n2$$

Assuming the noise on each channel is independent, the average RMS de-interleaved noise power is:

$$p=SQRT(0.5*n1*n1+0.5*n2*n2)=SQRT((n1*n1+n2*n2)/2)$$

If the noise power on each channel is identical (n=n1=n2) then there is no change in total de-interleaved noise power. However, if the noise on one channel is lower than the other by a factor m or n=n1=m*n2, then the de-interleaved noise power will be reduced on both de-interleaved channels, x1' and x2'.

$$p=SQRT(n*n+m*m*n*n)/2)=n*SQRT((1+m*m)/2)$$

The de-interleaved noise power is reduced by a factor M=SQRT ((1+m*m)/2). If one channel has no extra margin and the other has 3 dB extra margin then m=0.707 and M=0.866 or −1.25 dB.

Without the SDLBI the performance of the multi-channel system would be equal to the performance of the worse of the two channels. With SDLBI the performance is improved by a factor M, which is 1.25 dB for this example.

In this example embodiment, all symbols in the block are arithmetically combined with each other. This provides good impulse compression and protects against impulses that span multiple symbol intervals. In another embodiment, only subgroups of symbols are arithmetically combined with each other. These subgroups are then interleaved among themselves over the entire block. This variation provides the same protection against an impulse that spans multiple symbols, but has the advantage of a lower peak signal power, lower delay before error signals are available for adaptive algorithms or decision feedback equalizers, and lower burst processing cycle time.

While not illustrated in the preferred embodiment, other block sizes are possible using appropriate equations. The set of equations for a 2-symbol block interleaver are as follows:

$$x=(iLBIx[0]+iLBIx[1])*0.707;$$

$$y=(iLBIy[0]+iLBIy[1])*0.707;$$

$$iLBIx[4]=(iLBIx[0]-iLBIx[1])*0.707;$$

$$iLBIy[4]=(iLBIy[0]-iLBIy[1])*0.707;$$

The set of equations for 2 interleaved 2-symbol blocks are as follows:

$$x=(iLBIx[0]+iLBIx[1])*0.707;$$

$$y=(iLBIy[0]+iLBIy[1])*0.707;$$

$$iLBIx[4]=(iLBIx[2]+iLBIx[3])*0.707;$$

$$iLBIy[4]=(iLBIy[2]+iLBIy[3])*0.707;$$

$$iLBIx[5]=(iLBIx[0]-iLBIx[1])*0.707;$$

$$iLBIy[5]=(iLBIy[0]-iLBIy[1])*0.707;$$

$$iLBIx[6]=(iLBIx[2]-iLBIx[3])*0.707;$$

$$iLBIy[6]=(iLBIy[2]-iLBIy[3])*0.707;$$

The set of equations for an 8-symbol interleaver are as follows:

$$LBIx[0]=(x[0]+x[1]+x[2]+x[3]+x[4]+x[5]+x[6]+x[7])*sqrt(\tfrac{1}{8})$$

$$LBIy[0]=(y[0]+y[1]+y[2]+y[3]+y[4]+y[5]+y[6]+y[7])*sqrt(\tfrac{1}{8})$$

$$LBIx[1]=(x[0]+x[1]+x[2]+x[3]-x[4]-x[5]-x[6]-x[7])*sqrt(\tfrac{1}{8})$$

$$LBIy[1]=(y[0]+y[1]+y[2]+y[3]-y[4]-y[5]-y[6]-y[7])*sqrt(\tfrac{1}{8})$$

$$LBIx[2]=(x[0]+x[1]-x[2]-x[39+x[4]+x[5]x[6]-x7])*sqrt(\tfrac{1}{8})$$

$$LBIy[2]=(y[0]+y[1]-y[2]-y[3]+y[4]+y[5]-y[6]-y[7])*sqrt(\tfrac{1}{8})$$

$$LBIx[3]=(x[0]+x[1]-x[2]-x[3]-x[4]-x[5]+x[6]+x[7])*sqrt(\tfrac{1}{8})$$

$$LBIy[3]=(y[0]+y[1]-y[2]-y[3]-y[4]-y[5]+y[6]+y[7])*sqrt(\tfrac{1}{8})$$

$$LBIx[4]=(x[0]-x[1]+x[2]-x[3]+x[4]-x[5]+x[6]-x[7])*sqrt(\tfrac{1}{8})$$

$$LBIy[4]=(y[0]-y[1]+y[2]-y[3]+y[4]-y[5]+y[6]-y[7])*sqrt(\tfrac{1}{8})$$

$$LBIx[5]=(x[0]-x[1]+x[2]-x[3]-x[4]+x[5]-x[6]+x[7])*sqrt(\tfrac{1}{8})$$

$$LBIy[5]=(y[0]-y[1]+y[2]-y[3]-y[4]+y[5]-y[6]+y[7])*sqrt(\tfrac{1}{8})$$

$$LBIx[6]=(x[0]-x[1]-x[2]+x[3]+x[4]-x[5]-x[6]+x[7])*sqrt(\tfrac{1}{8})$$

$$LBIy[6]=(y[0]-y[1]-y[2]+y[3]+y[4]-y[5]-y[6]+y[7])*sqrt(\tfrac{1}{8})$$

$$LBIx[7]=(x[0]-x[1]-x[2]+x[3]-x[4]+x[5]+x[6]-x[7])*sqrt(\tfrac{1}{8})$$

$$LBIy[7]=(y[0]-y[1]-y[2]+y[3]-y[4]+y[5]+y[6]-y[7])*sqrt(\tfrac{1}{8})$$

Figure 6:
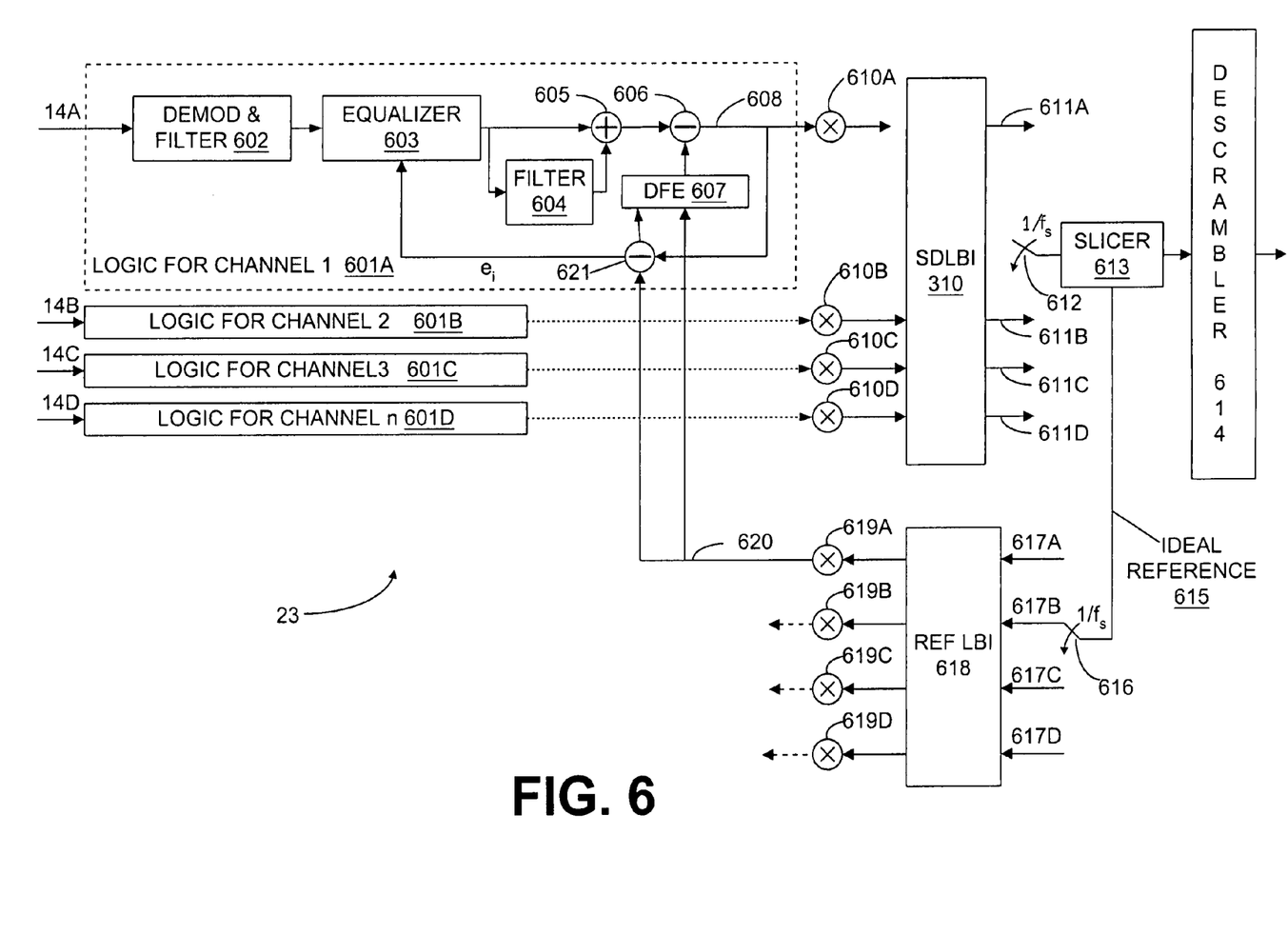
FIG. 6 is a block diagram of the receiver of FIG. 2.

FIG. 6 is a block diagram of the receiver 23 of FIG. 2. Communication channels 14a-d each supply a receive signal, so the portion of the receiver 23 before the SDLBI 310 is replicated N times. This replicated logic is shown in FIG. 6 as logic block 601. The receive signal is converted to digital (not shown), then input to demodulator 602 in logic block 601. Demodulator 602 may also contain filtering logic. The demodulated signal is input to equalizer 603, which compensates for channel distortion.

In this example embodiment, a noise-whitening filter 604 is used in combination with an intersymbol interference DFE. The output of equalizer 603 is fed into noise-whitening filter 604, and the output of noise-whitening filter 604 is recombined with the equalized signal by adder 605. The output of adder 605 is supplied to subtractor 606, which subtracts the output of DFE 607. The output of subtractor 606 is supplied on line 608 as an input to SDLBI 310. Alternatively, a noise-whitening DFE could be used. In that case, noise whitening filter 604 is unnecessary and the output of equalizer 603 is fed directly into DFE 607

Line 608 is one of the N inputs to SDLBI 310 provided by the N logic blocks 601 a-d. Each of the N inputs is first renormalized using scalers 610a-d. Using the same equations as the transmitter 22, SDLBI 310 operates on the block of N interleaved symbols to recover, in one symbol period, a block of N de-interleaved symbols.

The block of N de-interleaved symbols is output on lines 611a-d. In this example embodiment, lines 611a-d are fed into a commutator switch 612, which operates at the rate $1/f_s$ to supply a stream of symbols to slicer 613. Alternatively, multiple slicers could be used, with each connected on lines 611a-d, so that no commutator switch 612 is necessary.

The slicer 613 outputs decoded data. The decoded data is supplied to descrambler 614, which outputs data RXDATA. Slicer 613 also generates a stream of ideal reference symbols 615. Commutator switch 616 splits the stream of ideal reference symbols 615 into N ideal reference symbol, which are supplied on lines 617a-d to Reference SDLBI 618.

Reference SDLBI 618 uses the same equations as transmitter 22 and SDLBI 310 to re-interleave the reference symbols, which are output onto lines 619a-d. (The purpose for re-interleaving will be explained shortly.) Each re-interleaved reference symbol on lines 619a-d is scaled and then fed back into the appropriate DFE 607 on line 620. For example, symbols from line 619a are fed back into the DFE 607 of logic block 601a (the first channel), symbols from line 619b are fed back into the DFE of logic block 601b (the second channel), and so on.

Slicer 613 and DFE 607 form a feedback loop. The feedback loop allows the DFE 607 to use previously detected symbols to correct for intersymbol interference (ISI) in the next symbol. When linear block interleaving is used without space diversification, as for example described in co-pending patent application 1997-57, the DFE 607 waits for a block of N symbols to be detected before updating. The DFE 607 is inefficient with this delay. In contrast, when the space diversification technique of the present invention is used, the DFE 607 can update as each symbol is detected. This reduced delay allows the DFE 607 to correct errors more efficiently.

In a system without space diversified linear block interleaving, the slicer 613 would provide reference symbol feedback directly to the DFE 607. When space diversified linear block interleaving is used as in the present invention, the reference symbols must be re-interleaved before input to the DFE 607, because de-interleaved reference symbols would not provide correct feedback to the DFE 607. Instead, since the received signal input to the DFE 607 is interleaved, the feedback reference symbol input should also be in interleaved form. This is accomplished by re-interleaving to reverse the effects of the de-interleaving which occurs before slicer 613.

The re-interleaved reference symbols on lines 619a-d are also input to the subtractor 621 in the appropriate logic block 601. Subtractor 621 subtracts the re-interleaved reference symbol from the signal on line 608. The output of subtractor 621 is provided as training error signal $e_t$ to equalizer 603. The equalizer 603 uses training error signal $e_i$ to adapt its filter coefficients. The output of subtractor 621 is also fed back into DFE 607.

Another embodiment of the invention combines sequential (rather than space diversified) linear block interleaving with precoding and constellation shaping. As explained above, when sequential linear block interleaving is used there is a delay in providing reference symbols to the DFE 607. The resulting inefficiency in the DFE 607 is addressed in this embodiment by using a precoder in the transmitter instead of a DFE 607 in the receiver. Constellation shaping in combination with sequential linear block interleaving provides up to 1.5 dB performance gain while reducing the peak signal power of the interleaved symbols, as compared to using sequential linear block interleaving alone.

Shaping refers to changing the frequency of occurrence of signal points within the signal constellation to reduce power. One method of shaping, called Shell Mapping, chooses points from the inner shells of the constellation sphere more often than the outer shells. This reduces power because points closer to the center of the sphere use less power. These and other shaping techniques will be familiar to one skilled in the art.

Figure 7:
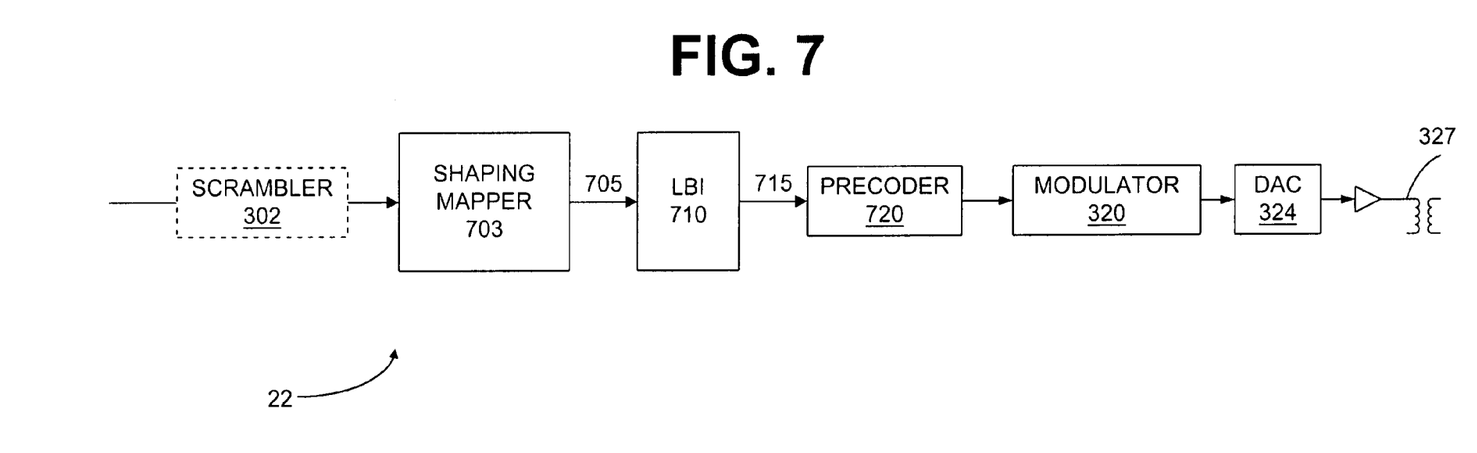
FIG. 7 is a block diagram of a transmitter which includes sequential linear block interleaving in combination with precoding and constellation shaping.

FIG. 7 is a block diagram of a transmitter 22 which includes sequential linear block interleaving in combination with precoding and constellation shaping. An N-bit word of data to be transmitted is input on line 301 to optional scrambler 302. In the absence of scrambler 302, data to be transmitted is input directly to shaping mapper 703. Scrambler 302 can be either a self-synchronizing scrambler or a preset free running scrambler as known in the art. If scrambler 302 is employed, then a scrambled N-bit data word is supplied on line 704 to shaping mapper 703.

Shaping mapper 703 supplies shaped complex X and Y vectors representing the data to be transmitted in a signal space constellation as known in the art, using for example, quadrature amplitude modulation (QAM). While the output of mapper 703 on line 705 is shown as a single line in this preferred embodiment, the output of mapper 703 is a multi-dimensional signal comprising complex X and Y vectors. The concepts and features of the present invention are equally applicable to, for example, uni-dimensional signals such as those generated by a pulse amplitude modulation (PAM) signal, as well as other modulation schemes as known in the art, such as Trellis coded modulation.

The output line 705 from mapper 703 provides a stream of input symbols to the LBI 710. LBI 710 collects a block of N symbols and sequentially outputs, after N symbol periods, an interleaved block of N symbols. The operation of LBI 710 will be discussed in more detail later.

The symbols are encoded by precoder 720, which introduces a controlled amount intersymbol interference into the channel. This ISI can be easily cancelled out in the receiver by a noise whitening filter or an inverse precoder, without using a DFE. Precoder 720 may be, for example, a Tomlinson precoder or a feedback precoder, as is well known in the art.

The precoder output is supplied to modulator 320, which modulates the interleaved symbol onto a carrier. After any filtering appropriate for a particular modulation scheme (for example, Hilbert filtering), each modulated signal is then supplied to a communication channel in a manner which is channel-dependent. In this example, the communication channel corresponds to a single twisted pair, so the modulated signal is supplied first to a DAC 324 and then to a conventional hybrid circuit 327.

Figure 8:
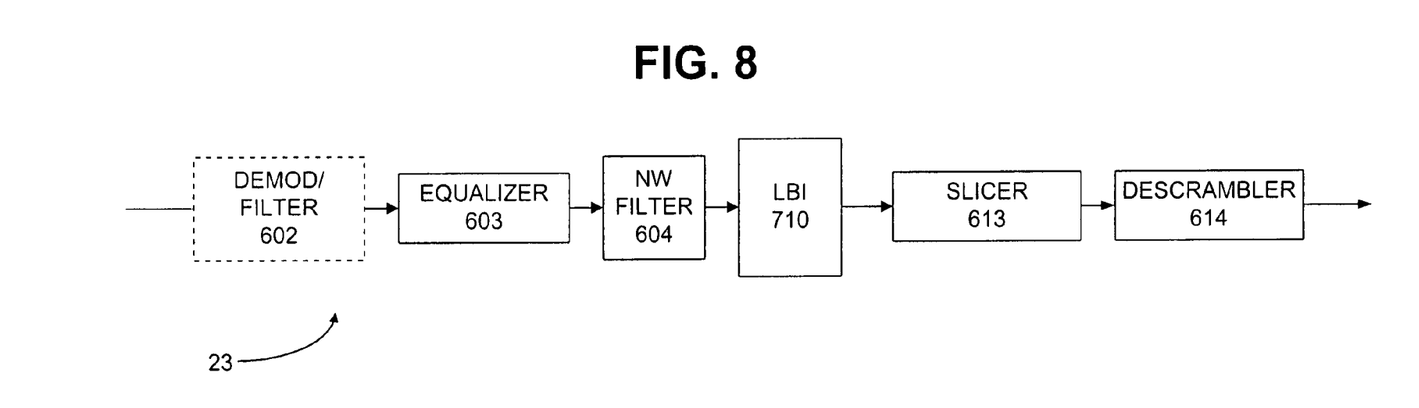
FIG. 8 is a block diagram of a receiver which includes sequential linear block interleaving in combination with preceding and constellation shaping.

FIG. 8 is a block diagram of a receiver 23 which includes sequential linear block interleaving in combination with precoding and constellation shaping. Communication channel 14 supplies a receive signal, which is converted to digital (not shown), then input to demodulator 602. Demodulator 602 may also contain filtering logic. The demodulated signal is input to equalizer 603, which compensates for channel distortions. The output of equalizer 603 is supplied to noise whitening filter 604, which matches the filter in the transmitter's precoder 720. The noise-whitening filter 604 is followed by LBI 710, which uses the same equations as LBI 710 in the transmitter 22. Finally, the de-interleaved symbols are decoded by slicer 613. The scrambled data output by slicer 613 is unscrambled by descrambler 614, which outputs RXDATA.

Figure 9:
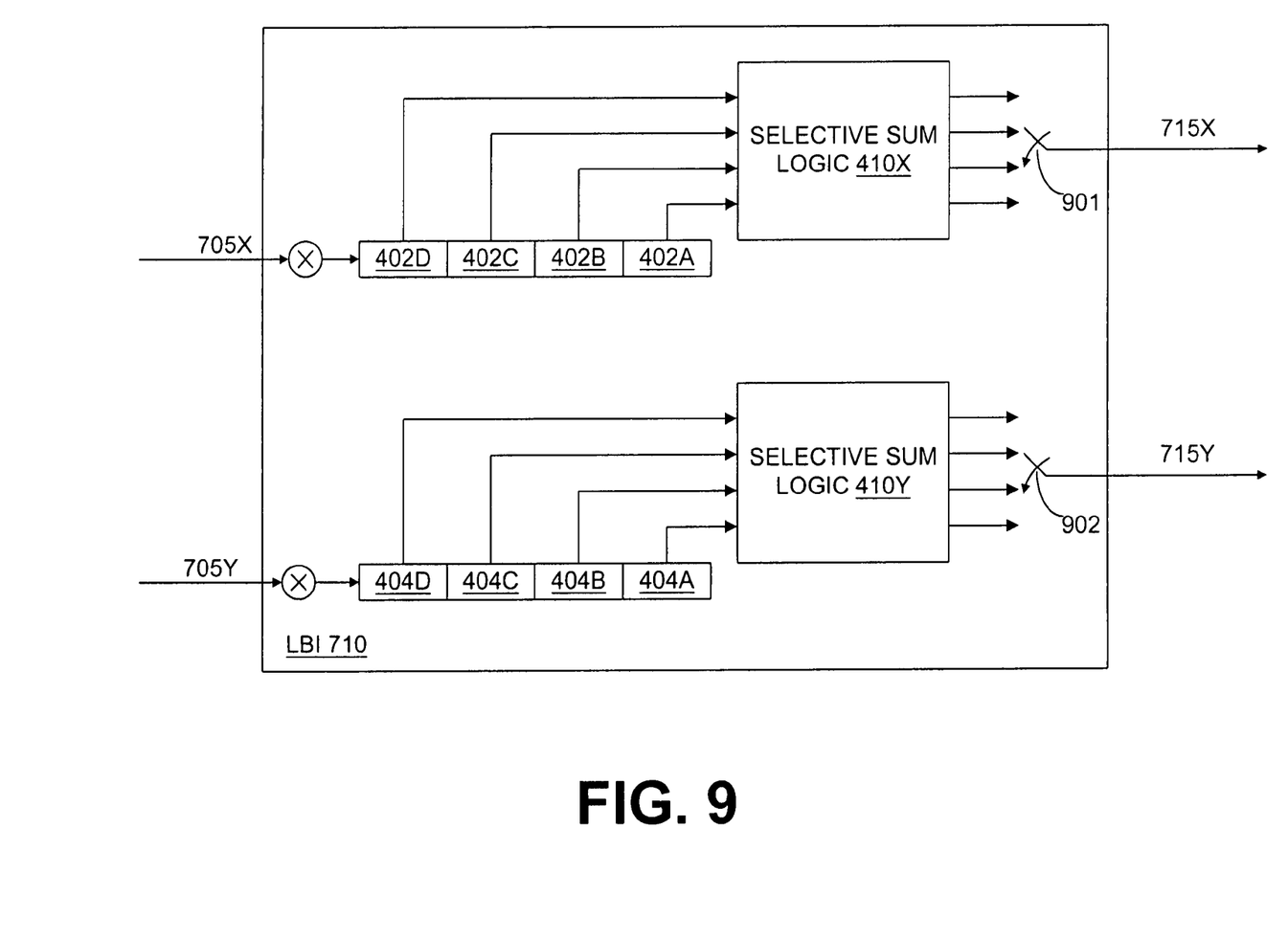
FIG. 9 is a block diagram of the linear block interleaver from FIG. 7.

FIG. 9 is a block diagram of LBI 710 from FIG. 7. The LBI 710 contains logic to independently interleave the X and Y components of the two-dimensional input symbols provided by shaping mapper 703. The same LBI 710 is also used to de-interleave symbol combinations in the receiver in order to recover the original independent symbols.

The LBI 710 is divided into two identical logic blocks, one processing the X components and one processing the Y components of the two-dimensional input symbols. Therefore, although the input to LBI 710 is shown as a single line 705 in FIG. 7, it appears as two lines of input, 705x and 705y, in FIG. 9. Similarly, the LBI 710 in FIG. 9 is shown with two output lines, 715x and 715y. While shown in this preferred embodiment as operating on a two-dimensional signal, the LBI 710 of the present invention can operate on signals of any dimension by replicating the appropriate number of logic blocks inside LBI 710.

At each symbol time, the X and Y components of the next symbol are first scaled then shifted into registers 402 and 404. Therefore, after 4 symbol times location 402a will contain the X component of the first symbol, location 402b will contain the X component of the second symbol, location 402c will contain the X component of the third symbol and location 402d will contain the X component of the fourth symbol of the block. Similarly, after 4 symbol times, location 404a will contain the Y component of the first symbol, location 404b will contain the Y component of the second symbol, location 404c will contain the Y component of the third symbol and location 404d will contain the Y component of the fourth symbol.

Once the block of N symbols has been collected into registers 402 and 404, the contents of registers 402 and 404 are supplied to selective sum logic block 410x and 410y as follows. The contents of registers 402a-d, containing the scaled X components of N input symbols, are supplied to selective sum logic block 410x. Similarly, the contents of registers 404a-d, containing the scaled Y components of N input symbols, are supplied to selective sum logic block 410y. Taken together, the two selective sum logic blocks produce, after N=4 symbol periods, a block of N=4 interleaved output symbols which are sequentially output on lines 715x and 715y.

The first interleaved symbol in the block is selected by commutator switches 901 and 902 for output onto lines 715x and 715y. At the next symbol period, commutator switches 901 and 902 select the second interleaved symbol for output onto lines 715x and 715y. The third and fourth interleaved symbols are similarly selected for output in the third and fourth symbol periods. Thus, it takes 2*N=8 symbol periods to process a block of N symbols: N symbol periods to shift the symbols from line 705 into registers 402 and 404; and N symbol periods to switch the interleaved symbols out on line 715.

As is known in the art, pipeline registers at the output of selective sum logic 410x and 410y allow symbols to be selected for transmission by commutator switches 901 and 902 as new input symbols are accepted into registers 402 and 404. One symbol is input and one symbol is output for every symbol interval, with a throughput delay of N symbol periods. In contrast, the space diversity system of FIG. 3 allows N symbols to be processed simultaneously for all N channels with no additional throughput delay.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications as are suited to the particular use contemplated. All such modifications and variation are within the scope of the invention as determined by the appended claims when interpreted in accordance with the breadth to which they are fairly and legally entitled.

Therefore, having thus described the invention, at least the following is claimed:

1. A communication system comprising:
   first logic configured to combine a time series of N input symbols into a block of output symbols, wherein N is greater than one, wherein the block comprises N output symbols, wherein each of the output symbols comprises a combination of the N input symbols, wherein each of the input symbols is taken from a signaling constellation, and wherein each output symbol is associated with a respective one of a plurality of different channels, such that a stream of ideal reference symbols when re-interleaved generates error signals; and
   second logic configured to transmit each output symbol on one of the plurality of different channels.

2. The system of claim 1, further comprising:
   third logic configured to receive a transmitted signal, wherein the transmitted signal includes each output symbol; and
   fourth logic configured to combine the block of output symbols in order to recover the time series of N input symbols.

3. The system of claim 1, wherein each output symbol in the block appears simultaneously as an output of the first logic.

4. The system of claim 1, where each output symbol contains a weighted sample of all of the input symbols.

5. The system of claim 1, where the second logic transmits all output symbols simultaneously.

6. The system of claim 1, further comprising logic to scale each of the N input symbols by a scale factor.

7. The system of claim 2, where noise energy present in at least one of the received output symbols is spread among each of the recovered time series of N input symbols such that the noise energy is reduced.

8. The system of claim 2, further comprising:
   fifth logic configured to de-interleave the block of output symbols to produce a block of N de-interleaved reference symbols.

9. A method comprising:
   combining a time series of N input symbols into a block of output symbols, wherein N is greater than one, wherein the block comprises N output symbols, wherein each of the output symbols comprises a combination of the N input symbols, wherein each of the input symbols is taken from a signaling constellation, and wherein each output symbol is associated with a respective one of a plurality of different channels, such that a stream of ideal reference symbols when re-interleaved generates error signals; and transmitting each output symbol on one of the plurality of different channels.

10. The method of claim 9, further comprising:

receiving a transmitted signal; and combining the block of output symbols in order to recover the time series of N input symbols.

11. A communication system comprising:

means for combining a time series of N input symbols into a block of output symbols, wherein N is greater than one, wherein the block comprises N output symbols, wherein each of the output symbols comprises a combination of the N input symbols, where each of the input symbols is taken from a signaling constellation, and wherein each output symbol is associated with a respective one of a plurality of different channels, such that a stream of ideal reference symbols when re-interleaved generates error signals; and means for transmitting each output symbol on one of the plurality of different channels.

12. The system of claim 11, further comprising:

means for receiving a transmitted signal; and means for combining the block of output symbols in order to recover the time series of N input symbols.

13. The system of claim 12, further comprising:

means for de-interleaving the block of output symbols to produce a block of N de-interleaved reference symbols;

means for re-interleaving the ideal reference symbols to produce a block of N interleaved reference symbols;

means for updating a decision feedback equalizer with the each of the block of N interleaved reference symbols.

14. A program embodied in a computer-readable storage medium, the program comprising:

first logic configured to combine a time series of N input symbols into a block of output symbols, wherein N is greater than one, wherein the block comprises N output symbols, wherein each of the output symbols comprises a combination of the N input symbols, wherein each of the input symbols is taken from a signaling constellation, and wherein each output symbol is associated with a respective one of a plurality of different channels, such that a stream of ideal reference symbols when re-interleaved generates error signals; and second logic configured to transmit each output symbol on one of the plurality of different channels.

15. The program of claim 14, further comprising:

third logic configured to receive a transmitted signal; and fourth logic configured to combine the block of output symbols in order to recover the time series of N input symbols.

16. The program of claim 14, wherein each output symbol in the block appears simultaneously as the output of the first logic.

17. The program of claim 14, where each output symbol contains a weighted sample of all of the input symbols.

18. The program of claim 14, where the second logic transmits all output symbols simultaneously.

19. The system of claim 8, further comprising:

sixth logic configured to re-interleave the ideal reference symbols to produce a block of N interleaved reference symbols;

seventh logic configured to update a decision feedback equalizer with each of the N interleaved reference symbols.

* * * * *